United States Patent [19]

Aarsrud et al.

[11] Patent Number: 5,288,857
[45] Date of Patent: Feb. 22, 1994

[54] LIGNIN PREPARATION AND METHOD FOR ITS MANUFACTURE

[75] Inventors: Wilhelm Aarsrud; Hans Bergström, both of Vänersborg, Sweden; Ingemar Falkehag, Charleston, S.C.

[73] Assignee: Ligno Tech Sweden AB, Vargon, Sweden

[21] Appl. No.: 22,415

[22] Filed: Feb. 16, 1993

Related U.S. Application Data

[63] Continuation of Ser. No. 689,251, Jul. 23, 1991, abandoned.

[30] Foreign Application Priority Data

Dec. 12, 1988 [SE] Sweden .................................. 8804477

[51] Int. Cl.$^5$ .......................... C07G 1/00; C08L 97/00
[52] U.S. Cl. ..................................... 530/500; 530/501; 530/507
[58] Field of Search ........................ 530/500, 501, 507

[56] References Cited

U.S. PATENT DOCUMENTS

| | | | |
|---|---|---|---|
| 1,981,176 | 11/1934 | Howard . | |
| 2,217,814 | 10/1940 | Pritchard et al. | 530/500 |
| 4,764,597 | 8/1988 | Dilling | 530/500 |

*Primary Examiner*—John Kight, III
*Assistant Examiner*—Richard Jones
*Attorney, Agent, or Firm*—Young & Thompson

[57] ABSTRACT

The invention relates to a lignin preparation prepared from black liquor derived from an alkali delignification process, such as the sulphate process, soda process or polysulphide process. The lignin preparation comprises mainly lignin and at least the major part of the sodium content of the lignin separated from the black liquor deriving from such processes has been replaced with calcium, therewith to provide a lignin preparation having improved properties which render the preparation more suitable for use as fuel.

17 Claims, No Drawings

LIGNIN PREPARATION AND METHOD FOR ITS MANUFACTURE

This application is a continuation of application Ser. No. 07/689,251, filed Jul. 23, 1991, now abandoned.

The present invention relates to a lignin preparation and to a method for its manufacture.

Lignin is obtained as a secondary product when producing pulp in accordance with an alkali delignification process such as the sulphate process, soda process or polysulphide process. When wood is cooked in accordance with one of these processes, so-called black liquor is obtained, which contains the lignin removed from the wood during digestion. When practicing known techniques, the lignin is precipitated from the black liquor, by acidification and the precipitate is extracted by filtration. The filtrate is returned to the recycling system of the pulp mill.

The present invention is directed to lignin obtained by any of said processes, although primarily lignin obtained in the sulphate process.

The lignin removed from the system can be used as fuel, or as a starting material in the manufacture of chemical or chemitechnical products. Lignin which is extracted by separation processes that are run on an industrial scale will contain 1–1.5% by weight sulphur and often up to 4% by weight sodium. The sodium content often has a negative influence on the sintering properties of the ash that is obtained when burning the lignin, which makes rational handling of the ash difficult. Consequently, it is desirable to be able to raise the melting point of the ash, so as to avoid the occurrence of incrustations and deposits when burning the lignin, or rather when burning the precipitated and extracted lignin preparation.

When such industrially produced lignin, or lignin preparation, is burned as fuel for instance, the flue gases generated will Contain sulphur dioxide, which is likely to be further oxidized in the atmosphere and therewith constitute a load on the environment, through acid precipitation.

An object of the present invention is to provide a lignin fuel with which the ash formed will have an elevated melting point, and a further object is to provide a method for the manufacture of such a lignin-based fuel.

Furthermore, when burning the inventive lignin preparation, the sulphur present is bound chemically, so as to capture sulphur dioxide and therewith reduce the threat to the environment from this source.

These objects are achieved in accordance with the invention, primarily by eliminating or significantly reducing the sodium content of the lignin present in the black liquor, and secondarily, as a preferred embodiment, by replacing a major part of the sodium present with calcium.

As before mentioned, it is known to remove lignin from black liquor. For instance, SE 8402753-1 teaches a method in which lignin is precipitated from black liquor by introducing carbon dioxide thereinto. The lignin precipitate is separated from the liquor, together with other organic substances present therein, by filtration and is homogenized to form a suspension, which is then used as a fuel source within the mill.

Lignin which is separated from black liquor on an industrial scale with the aid of known techniques will contain significant quantities of sodium and sulphur, and consequently will have the aforesaid drawbacks when used as a fuel source.

With the intention of enabling a lignin preparation obtained from black liquor to be used as fuel, which preparation may also contain organic substances other than lignin, a primary object of the present invention is to elevate the melting point of the ash formed by combustion of the fuel, so as to prevent the ash from melting during said combustion and therewith to enable the ash to be handled in a suitable manner. The sodium present in the ash has a negative influence in this respect and will lower the melting point of the ash. Consequently, in accordance with the invention, a first procedure is to treat the lignin so as to reduce its sodium content. This can be achieved with the aid of various washing processes, as will be explained in more detail herebelow. In accordance with one preferred embodiment of the invention, a second procedure is to replace the sodium present in the lignin with a substance which will elevate the melting point of the ash. Calcium is an example of one such substance. According to another embodiment of the invention, in which the melting point of the ash is further elevated, other substances, which contain preferably acid components, such as silica and aluminum oxide in the form of kaolin are also added to the system.

A further object of the invention is to eliminate, or at least reduce, the presence of sulphur dioxide in the flue gases generated when burning the lignin preparation. Calcium is a substance which will bind sulphur when burning sulphur-containing fuels, so as to reduce the sulphur content of the flue gases. It has been possible to reduce the sulphur content of combustion gases by up to 90%, when calcium is added in a molar ratio Ca/S of about 2. When burning lignin in which the sodium content thereof, about 4% by weight, has been replaced with calcium, there is achieved an at least 60% reduction in the sulphur content of the combustion gases.

Another advantage afforded by the lignin preparation produced in accordance with the invention is that it is effective in reducing the sulphur content of the flue gases generated when the lignin is burned together with other sulphur-containing fuels, such as coal for instance. It is well known that sulphur dioxide will form in flue gases generated when burning coal, this sulphur dioxide constituting an environmental hazard, as beforementioned. Various systems for reducing the sulphur content of flue gases are known to the art. According to one known method, an approximate 40% reduction in sulphur content is achieved by introducing a calcium compound in the form of a particle dispersion. This method is thus not too successful. Furthermore, the method incurs additional costs in the provision of apparatus which will produce "spray mists", compressors, etc.. Naturally, such additional costs are undesirable. By using a lignin preparation that has been produced in accordance with the present invention and which thus has a higher calcium content than that required to reduce the intrinsic sulphur content thereof, it is possible, when burning the lignin together with coal for instance, to reduce the sulphur content of the flue gases to a far greater extent and in a cheaper and more effective manner than when applying known techniques.

The present invention thus relates to a method for obtaining from an alkali delignification process such as the sulphate soda or polysulphide process a fuel which is beneficial from the aspect of environmental safety and also from the aspect of combustion.

As beforementioned, according to a first embodiment of the invention there is formed a lignin fuel whose melting point has been raised by reducing the sodium content of the lignin. Although this reduction in sodium content can be achieved in various ways, it is preferred to achieve this reduction by treating the lignin cake with an acid, such as to remove the sodium ions from the lignin. A reduction of the sodium content down to 0.1% is possible when proceeding in this manner. The melting point of the ash can be elevated still further, by adding acid components containing silica or aluminum to the system. These two latter procedures will result in a total elevation of the melting point to above 1000° C., preferably above 1100° C. As before-mentioned, according to one preferred embodiment of the invention, the melting temperature of the ash is further elevated by ion exchange, in which the sodium ions are replaced with calcium ions, this substitution also affording the advantage of reducing the sulphur content of the flue gases generated when burning such lignin preparations.

Calcium can, in principle, be introduced during different stages of the lignin-recovery process. Thus, the following alternative procedures can be applied when practicing the present invention:

1. A calcium compound is added to the black liquor, prior to or during precipitation of the lignin.
2. A calcium-containing compound is added to the lignin precipitate.
3. A calcium compound is added while washing the filter cake, subsequent to isolating the filtrate.
4. A calcium compound is admixed with the lignin obtained subsequent to the filtering and washing process, wherein water can be added at the same time, depending on the desired physical form of the lignin, e.g. to produce a slurry.
5. A calcium compound is added to the filter cake, as in alternative 3 above, but is accompanied by acidification and filtering for removal of sodium ions.

According to the alternative 2, calcium is added appropriately in the form of calcium carbonate, although the filter cake must then be washed with an acid capable of forming a soluble calcium salt, e.g. sulphur-dioxide water, so that free calcium-ions are available for ion-exchange with sodium. It is necessary to carry out the washing process in a manner such that the lignin filter-cake will have a pH of beneath 9, preferably a pH of 7-9.

In the case of alternative 3, the calcium compound will preferably be a water-soluble salt, such as chloride, hydrogen sulphite or acetate, and the PH should lie between 7-9, also in this case.

Alternatives 4 and 5 require the provision of appropriate and effective mixing apparatus, although the lignin filter-cake must also be washed with an acid down to a low pH, suitably beneath pH 5, so as to remove sodium and replace the sodium with protons.

As beforementioned, the substitution of sodium in the lignin with calcium will result in an ash of higher melting point. However, depending on the combustion plant in which the fuel is burned, this may not at times be sufficient to avoid the problem of the formation of deposit in the combustion plant.

In such cases, the properties of the ash can be adjusted still further, by adding an acid component. Acid components which are suitable in these instances include kaolin, silica, aluminum oxide and slag, and also ash which has an acid nature. The melting point of the ash can be raised sufficiently, by introducing components such as these into the system, for instance by admixing the acid component with the filter-cake slurry obtained subsequent to filtration.

The invention will now be illustrated in more detail with reference to a number of preferred embodiments thereof described below.

EMBODIMENT 1

Black liquor obtained in a sulphate pulp process is evaporated or diluted, as necessary, to a consistency suitable for the process, whereafter gaseous carbon dioxide is introduced into the liquor, in order to precipitate the lignin content thereof. The liquor is then allowed to mature in a separate container, preferably while stirring the liquor, whereafter the liquor and the lignin flocculated therein is passed to a filtration plant.

The filtration plant will preferably include a belt-filter device comprising a filter belt the upper run of which is moved in a given direction. Suction boxes, or a system of suction boxes are, or is, disposed beneath the upper run of the filter-belt. In order to achieve the best possible effect, filtration is effected under a partial vacuum, and preferably with well separated filtering and washing zones.

The black liquor together with the flocculated lignin is supplied to the beginning of the filter belt upstream of the first suction box. The belt is driven at a slow speed, and the black liquor and its residual chemical content will be drawn through the filter belt and into the suction box, from where it is returned to the chemical recovery process of the system. The lignin flocs are unable to pass through the filter belt, and consequently remain on the belt in the form of a filter cake. The lignin, however, will nevertheless still contain residues of black liquor, and the sodium content of the lignin, in industrial processes of this kind, will normally be in the region of 4% by weight, and is bound substantially to acid groups in the lignin.

As the filter belt moves, the continuously formed filter cake is advanced to the next suction box, or system of suction boxes, i.e. the washing zone. Wash water is delivered to the filter cake, through wash boxes.

When the sodium content of the filter cake on the belt is to be substituted with calcium by ion-exchange in accordance with alternative 5 above, an acid or a salt is supplied to an appropriate wash box, for the application of ion-exchange liquid. The ion-exchange method enables the pH and sodium and calcium contents respectively of the filter cake to be adjusted to desired levels. Final washing of the filter cake is always effected with water from the last wash box in line.

This process results in a reduction of the sodium content, and it is possible to achieve a lignin sodiumcontent as low as 0.1% by weight, while introducing calcium into the lignin at the same time, therewith enabling a calcium content of 6% by weight to be readily achieved. A typical final ph-value is 8-9, which is suitably achieved by adjusting the pH of the washing liquid with $SO_2$-water for instance.

According to this embodiment, kaolin or a similar ashimproving additive can be added to the system, either to the lignin slurry prior to filtration or to the lignin filter-cake subsequent to filtration. The amount of kaolin added will preferably correspond to 5-30 % by weight, suitably 15% by weight of the ash of the ultimate lignin fuel.

Embodiment 2

Dolomite, CaMe (CO$_3$)$_2$ is used instead of calcium chloride with substantially the same percentual content, and is particularly advantageous when burning the lignin preparation together with coal, where relatively large quantities of sulphur need to be taken up.

EMBODIMENT 3

A satisfactory result can also be achieved with calcium hydroxide. The washing-water solution then had the following composition:

| | |
|---|---|
| water | 95% by weight |
| calcium hydroxide Ca(OH)$_2$ | 5% by weight. |

In this case it is necessary to wash the filter cake with SO$_2$-water (1710% concentration) to a pH beneath 9.

EMBODIMENT 4

Calcium carbonate is added to the precipitated lignin slurry upstream of the filter in an amount of 3–20% calculated on the lignin. The filter cake is washed with an acid washing water, suitably sulphur-dioxide water, down to a pH beneath 9, suitably 7–9.

EMBODIMENT 5

Calcium carbonate, corresponding to 3–20 % by weight of the lignin, together with kaolin, corresponding to 0.4–3% of the lignin, is added to the lignin filter-cake washed in an acid environment, to a pH beneath 4.

The use of calcium carbonate provides a process which can be readily controlled and which will result in a preparation having the preferred properties: Low sodium content and a relatively high calcium content. Further advantages from a technical aspect of combustion can be obtained by adding kaolin, which provides improved ash properties.

Should calcium carbonate not be available for some reason or other, it is found that a satisfactory result can also be achieved with calcium hydroxide in accordance with embodiment 3 above. In certain instances, dolomite can replace or be used together with one of the other calcium compounds mentioned, such as in embodiment 2 above.

As beforementioned, the kaolin used in accordance with embodiment 5 can be replaced with other acid components, such as silica, aluminum oxide and slag, and also ash which has an acid nature. The quantities in which such components are added are suitably established experimentally, such that the resultant component composition will be adapted to prevailing combustion conditions with respect to obtaining an ash having improved properties.

The invention is not restricted to the aforedescribed embodiments. For instance, it is not necessary to replace all of the sodium content of the lignin with calcium in order to achieve acceptable ash properties. A total replacement shall be understood as an embodiment which is optimized environmentally. Naturally, the invention can also be applied in plants in which separate sulphur-reducing means are already found, and in such cases the addition of calcium may be superfluous. In this latter case, the treatment procedures relating, for instance, to the melting point of the ash are of greater interest. A lignin product in which the sodium content has been reduced solely to increase the melting point of the ash is thus usable per se.

The sodium content can be best reduced with an acid washing stage to a pH of beneath 4 in the filter cake.

When the lignin is to be burned together with another sulphur-containing fuel, such as coal, it is appropriate to further increase the calcium content of the lignin. The calcium content of the lignin is, to some extent, proportional to the ph-value. In the case of basic lignin, the calcium is present in the form of CA(OH)$_2$ up to a pH of 11, and then in a maximum concentration of 9% with a sodium content of 0.1%. At pH-values above 11, the calcium is bound to the lignin in the form of Ca OH$^+$. Trials carried out on a lignin filter-cake having a pH of 12.4 showed that it is possible to bind 24.4% calcium in this latter form.

It is interesting to note that lignin in a highly acid form, i.e. having a very low pH, is also able to bind a large quantity of calcium. Calcium is bound as Ca$^{++}$ or CAOH$^+$, depending on the amount in which the calcium compound is present and its form, e.g. calcium carbonate or calcium hydroxide, and the final PH.

We claim:

1. A lignin fuel preparation which upon combustion will form an ash having an elevated melting point, said preparation containing predominantly lignin obtained by precipitation from black liquor derived directly from an alkali delignification process selected from the group consisting of the sulphate process, the soda process and the polysulphide process, and wherein the original sodium content of the lignin has been reduced by treating the lignin precipitate so as to be less than 2% by weight calculated on the dry weight of the lignin, and that sodium removed from the lignin has been replaced by calcium such that the calcium content of the lignin exceeds 2% by weight calculated on the dry weight of the lignin, said preparation further including an acid component selected from the group consisting of kaolin, silicon dioxide, aluminum oxide and slag, ash of an acid nature, and mixtures thereof.

2. A lignin preparation according to claim 1, wherein the original sodium content of the lignin has been reduced so as to be less than 1% by weight calculated on the dry weight of the lignin.

3. A lignin preparation according to claim 1, characterized in that its sintering temperature exceeds 1000° C.

4. A lignin preparation according to claim 3, wherein the sintering temperature exceeds 1100° C.

5. A lignin preparation according to claim 1, wherein the sodium content remaining is between 1.2–0.2% by weight, and the calcium content is at least 3% by weight, calculated on the dry weight of the lignin.

6. A lignin preparation according to claim 1, wherein the acid component is kaolin in a quantity of 5–50% by weight calculated on the ash obtained when burning the preparation.

7. A lignin preparation according to claim 6, wherein kaolin is present in a quantity of 5–30% by weight calculated on the ash obtained when burning the preparation.

8. A method for producing a lignin fuel preparation, which upon combustion will form an ash having an elevated melting point, said preparation containing lignin derived from an alkali delignification process selected from the group consisting of the sulphate process, the soda process and the polysulphide process, which comprises extracting said lignin by precipitation from black liquor directly derived from one of said processes, separating the lignin precipitate from a black liquor residue by filtration, and removing at least a major part of the sodium content of the lignin by washing with an acid capable of forming a soluble calcium salt, down to a pH value of 9 or less.

9. A method according to claim 8, wherein the acid used during washing is sulphur-dioxide water, and the pH is lowered to a value between 7 and 9.

10. A method according to claim 8, characterized by introducing a calcium compound prior to said precipitation, so as to replace the sodium removed from the lignin with calcium.

11. A method according to claim 10, characterized in that the calcium compound is calcium carbonate.

12. A method according to claim 10, characterized by adding an acid compound containing silica, aluminum oxide, slag or ash of an acid nature, in addition to said calcium compound.

13. A method according to claim 8, characterized by adding a calcium compound to the lignin precipitate.

14. A method according to claim 13, characterized by filtering off the lignin precipitate so as to obtain a filtrate and a filter cake, and by adding the calcium compound while washing the filter cake, subsequent to removal of the filtrate.

15. A method according to claim 13, characterized by adding water to the lignin filter cake while washing so as to produce a slurried filter cake, washing the lignin down to a pH value below 4, and subsequently admixing calcium carbonate with the slurried filter cake.

16. A method according to claim 8, wherein the acid used for washing the lignin is selected from the group consisting of sulphuric acid and residual acid from $ClO_2$ preparation, down to a pH value below 8, and then adding a calcium compound.

17. A method according to claim 8, characterized by introducing a calcium compound during said precipitation process, so as to replace the sodium removed from the lignin with calcium.

* * * * *